(12) United States Patent
Morita et al.

(10) Patent No.: US 7,886,160 B2
(45) Date of Patent: Feb. 8, 2011

(54) INFORMATION PROCESSING APPARATUS AND METHOD, AND COMPUTER PROGRAM

(75) Inventors: Takao Morita, Tokyo (JP); Yukihiko Aoki, Tokyo (JP); Shinichi Kawano, Tokyo (JP); Hideho Gomi, Kanagawa (JP); Tatsuaki Yukawa, Kanagawa (JP); Yuichi Izumi, Tokyo (JP)

(73) Assignee: Sony Corporation, Tokyo (JP)

( * ) Notice: Subject to any disclaimer, the term of this patent is extended or adjusted under 35 U.S.C. 154(b) by 878 days.

(21) Appl. No.: 11/427,163

(22) Filed: Jun. 28, 2006

(65) Prior Publication Data

US 2007/0033421 A1 Feb. 8, 2007

(30) Foreign Application Priority Data

Jul. 21, 2005 (JP) ............... 2005-211858

(51) Int. Cl.
*H04L 9/00* (2006.01)
(52) U.S. Cl. ............... 713/193; 713/189; 725/31
(58) Field of Classification Search ............... 713/193; 725/31
See application file for complete search history.

(56) References Cited

U.S. PATENT DOCUMENTS

2004/0064688 A1* 4/2004 Jacobs ............... 713/150
2007/0083663 A1* 4/2007 Tanabe et al. ............... 709/230

FOREIGN PATENT DOCUMENTS

JP 2005-117458 4/2005

OTHER PUBLICATIONS

"Digital Transmission Content Protection Specification", vol. 1, Revision 1.4 (Informational Version), Feb. 28, 2005, pp. 1-81.
"Mapping DTCP to IP", DTCP vol. 1, Supplement E, Revision 1.1 (Informational Version), Feb. 28, 2005, pp. 1-32.
"Darpa Internet Program Protocol Specification", Internet Protocol, RFC: 791, Sep. 1981, pp. 1-52.

* cited by examiner

*Primary Examiner*—Nasser Moazzami
*Assistant Examiner*—Lisa Lewis
(74) *Attorney, Agent, or Firm*—Oblon, Spivak, McClelland, Maier & Neustadt, L.L.P.

(57) ABSTRACT

An information processing apparatus for processing encrypted data input as a byte stream with dynamically changing decryption keys includes the following elements. An encrypted data receiving section receives encrypted data input as a byte stream, identifies a range of data that is decrypted using an identical key as a unit of decryption, extracts information necessary for decryption from the byte stream, and outputs encrypted data sets in which the extracted information is added to segments of the encrypted data. An encrypted data decrypting section sequentially decrypts the encrypted data by queuing the encrypted data sets while distributing the encrypted data sets to generate plaintext data. A plaintext processing section processes the generated plaintext data.

18 Claims, 11 Drawing Sheets

INFORMATION PROCESSING APPARATUS AND METHOD, AND COMPUTER PROGRAM

CROSS REFERENCES TO RELATED APPLICATIONS

The present invention contains subject matter related to Japanese Patent Application JP 2005-211858 filed in the Japanese Patent Office on Jul. 21, 2005, the entire contents of which are incorporated herein by reference.

BACKGROUND OF THE INVENTION

1. Field of the Invention

The present invention relates to information processing apparatuses and methods, and computer programs therefor for decrypting content encrypted for copyright protection or other purposes. In particular, the present invention relates to information processing apparatuses and methods, and computer programs therefor for decrypting content encrypted and transmitted over an Internet protocol (IP) network.

More specifically, the present invention relates to an information processing apparatus and method, and a computer program therefor for decrypting encrypted data input as a long byte stream, such as a Transmission Control Protocol (TCP) stream, with dynamically changing decryption keys. In particular, the present invention relates to an information processing apparatus and method, and a computer program therefor for decrypting a byte stream without interrupting processing at a key change point where the key being used is exchanged.

2. Description of the Related Art

Recently, content distribution and delivery services for providing content, such as video and music, over networks have increasingly been provided. Such services allow content distribution to be carried out between remote terminals over networks without the need to move media such as compact disks (CDs) and digital versatile disks (DVDs). Content to be handled over networks is protected under copyright laws as one of copyrighted works against unauthorized use such as unauthorized copying or tampering. In the Copyright Law of Japan, the reproduction of a work by a user him/herself for the purpose of his/her personal or home use would be permitted under Article 30, whereas, the use of copies of a work for purposes other than the personal or private use would be prohibited under Article 49 (1).

Since such content is digital data and is vulnerable to unauthorized access and modification such as copying and tampering, there is a demand for protection against unauthorized use in view of not only legal but also technical solutions while permitting the personal or home use of the content.

With the recent increasing utilization of digital content, a number of technologies for the purpose of copyright protection have been developed. For example, the Digital Transmission Content Protection (DTCP) standard, which is an industry standard for protecting digital transmission content, defines a mechanism for content transmission in a copyright-protected environment (see, for example, DTCP Specification Volume 1 Revision 1.4 (Informational Version), which is available from the world wide web at the "dtcp.com" website).

In DTCP, a protocol for authentication between devices for content transmission and a protocol for transmission of encrypted content are specified. In summary, the specification defines that a DTCP-compliant device should not send any easy-to-use, compressed content, such as MPEG (Moving Picture Experts Group) content, to outside the device in the unencrypted form, that key exchange necessary for decryption of encrypted content should be carried out according to a predetermined authentication and key exchange (AKE) algorithm, and that the range of devices through which key exchange is performed using AKE commands should be limited.

A content provider, or a server (DTCP source), and a content consumer, or a client (DTCP sink), share a key through an authentication procedure by sending and receiving AKE commands. The key is used to encrypt a transmission line to perform content transmission. An unauthorized client could not obtain a cryptographic key unless it has successfully been authenticated with the server, and thus could not receive the content. Further, by limiting the number and range of devices that transmit and receive AKE commands, the use of the content can be limited to personal or home use, as defined by copyright law.

Initially, DTCP defines transmission of digital content over a home network using a transmission line such as IEEE 1394. Recently, the development of a sophisticated technology, called DTCP-IP, in which IEEE-1394-based DTCP technology is incorporated into IP network technology has advanced. Since most home networks are connected via routers to external wide area networks such as the Internet, the establishment of DTCP-IP technology provides flexible and efficient use of digital content over an IP network while protecting the content.

Although DTCP-IP technology is fundamentally involved in the DTCP standard and is a DTCP-resembling technology in which DTCP technology is incorporated into IP network technology, DTCP-IP technology is different from the original, IEEE-1394-based DTCP technology in that an IP network is used as a transmission line and that encrypted content is transmitted using the HTTP or RTP protocol. Since a variety of devices, such as personal computers (PCs), are connected to the IP network, there is a high risk of eavesdropping or tampering of data. Therefore, DTCP-IP further specifies a method for transmission of content over the network while protecting the content although it is fundamentally a DTCP-resembling technology in which DTCP technology is incorporated into IP network technology (see, for example, DTCP Specification Volume 1 Supplement E Mapping DTCP to IP, Revision 1.1 (Informational Version), which is available from the world wide web at the "dtcp.com" website).

A content transmission procedure according to DTCP-IP will be described. DTCP-compliant devices are classified into two types, i.e., one referred to as "DTCP_Source", and the other as "DTCP_Sink". A DTCP_Source device serving as a server device receives a request for content, and transmits the content. A DTCP_Sink device serving as a client device requests content, receives the content, and plays back or records the content.

FIG. 10 illustrates a mechanism for performing an AKE-based key exchange procedure between a DTCP_Source device and a DTCP_Sink device and performing encrypted content transmission using a key shared through the key exchange procedure. In the illustrated example, the content transmission is performed using the HTTP protocol.

First, the DTCP_Source device and the DTCP_Sink device establish a single TCP/IP connection, and authenticate each other. This authentication is referred to as a "DTCP authentication" or an "AKE (Authentication and Key Exchange)". A DTCP-compliant device has a unique device ID and authentication key $K_{auth}$ embedded therein by a certification organization called DTLA (Digital Transmission Licensing Administrator). In the DTCP authentication procedure, after the DTCP_Source device and the DTCP_Sink device use such information to verify that they are authorized DTCP-compliant devices, the authentication key $K_{auth}$ for encrypting or decrypting content, which is managed by the DTCP_Source device, can be shared between the DTCP_Source device and the DTCP_Sink device.

When the AKE procedure succeeds, the DTCP_Source device and the DTCP_Sink device individually perform similar internal processing to generate a seed key $K_x$, which is the seed of a content key, from the authentication key $K_{auth}$. The seed key $K_x$ is used to generate a content key $K_c$ when the content is transmitted (discussed below).

After performing the AKE-based authentication and key exchange procedure between the DTCP-compliant devices, the DTCP_Sink device requests content on the DTCP_Source device. The DTCP_Source device can notify in advance the DTCP_Sink device of the content location for accessing the content on the DTCP_Source device via a content directory service (CDS) or the like. The DTCP_Sink device may use a protocol, such as HTTP (Hyper Text Transfer Protocol) or RTP (Real Time Protocol), to request the content.

As illustrated in FIG. 10, when the content is requested according to the HTTP procedure, the DTCP_Source device serves as an HTTP server and the DTCP_Sink device serves as an HTTP client, between which the transmission of the content is initiated. When an RTP-based transmission is requested, the DTCP_Source device serves as an RTP sender and the DTCP_Sink device serves as an RTP receiver, between which the transmission of the content is initiated. Other transmission protocols, such as RSTP (Real Time Streaming Protocol), may also be adopted.

When content transmission is performed according to HTTP, the HTTP client creates a TCP/IP connection for HTTP, which is different from the TCP/IP connection for the DTCP authentication (that is, each of the DTCP_Source device and the DTCP_Sink device has individual sockets for the AKE procedure and content transmission (a socket is a set of an IP address and a port number)). The HTTP client requests content on the HTTP server according to a similar operation procedure to the standard HTTP procedure. The HTTP server returns the requested content as an HTTP response.

The data transmitted as the HTTP response is data into which the HTTP server, i.e., the DTCP_Source device, encrypts the content using the key shared through the AKE authentication.

Specifically, the DTCP_Source device generates a nonce $N_c$ using random numbers, and generates the content key $K_c$ based on the seed key $K_x$ and nonce $N_c$. The DTCP_Source device encrypts the content requested by the DTCP_Sink device using the content key $K_c$, and sends a TCP stream carrying the encrypted content and the nonce $N_c$ to the DTCP_Sink device. Under the IP protocol, the TCP stream is divided by a predetermined packet size as a unit into packets to produce IP packets by adding headers to the packets, and the IP packets are delivered to a specified IP address (see, for example, RFC (Request For Comment) 791 INTERNET PROTOCOL).

Upon receiving the IP packets from the DTCP_Source device, the DTCP_Sink device reassembles the received IP packets into the TCP stream. The nonce $N_c$ extracted from the stream and a key $K_x$ determined from the authentication key $K_{auth}$ are used to determine the content key $K_c$. The content key $K_c$ is used to decrypt the encrypted content. The decrypted plaintext content is played back or recorded.

Accordingly, DTCP-IP can provide a secure content transmission protocol even over an IP network, which enables the content to be protected against eavesdropping or tampering in the middle of the transmission line by performing authentication between DTCP-compliant devices to share a key between the DTCP-authenticated devices and encrypting and decrypting transmission content.

Encrypted communication is common for protection of data being communicated. However, if the same cryptographic key is continuously used, the risk of breaking the key increases. A general solution is to change the cryptographic key regularly, every specific data length, or at any time during data communication.

For example, in wireless local area network (LAN) systems vulnerable to eavesdropping, security based on Wired Equivalent Privacy (WEP) is generally used. However, such WEP-based security is so weak that the key used to encrypt consecutive packets can easily be guessed, and, if the same WEP key is continuously used for a long time, the key can be broken. Nevertheless, since it takes some time to break the WEP key, changing the WEP key at regular time intervals can prevent the WEP key from being broken (see, for example, Japanese Unexamined Patent Application Publication No. 2005-117458). Even if the WEP key is broken, the WEP key is changed regularly, and thus the encrypted content could not be decrypted with the broken key, which is safe.

Further, if the same cryptographic key is continuously used across an entire long TCP stream, the risk of breaking the key increases. In DTCP-IP, therefore, it is specified that a source device should update the nonce $N_c$, or the content key $K_c$, every 128 MB of content (see, for example, DTCP Volume 1 Supplement E Mapping DTCP to IP, Revision 1.1 (Informational Version), which is available from the world wide web at the "dtcp.com" website). In a byte stream, the range of data that is encrypted using the content key $K_c$ generated from the same nonce $N_c$ is used as a unit of decryption by which decryption is performed using the same key.

However, in an apparatus for receiving and decrypting encrypted data as a byte stream over a network, such as TCP/IP, or from a file system and processing the decrypted data and a program therefor, if the key for decryption is changed in the middle of the data, the decryption processing may be interrupted at the key change point where the key being used is changed.

FIG. 11 schematically illustrates a functional structure of a communication apparatus of the related art that receives a byte stream transmitted with decryption keys changed in the middle of the stream. Encrypted data delivered in the form of the byte stream over a network or from a file system is data with decryption keys changed in the middle.

A receiving section handles a range of data in the input encrypted data, which is decrypted using the same key, as a single unit of decryption (in FIG. 11, encrypted data 1, encrypted data 2, . . . ), and sequentially transfers the data units to a decrypting section downstream from the receiving section.

When the key is changed on the byte stream, the decrypting section is not allowed to change the key until all encrypted data in the unit of decryption by which the data unit is decrypted using the previous key has been decrypted, thus preventing the encrypted data in the unit of decryption by which the data unit is decrypted using the changed key from being input.

In this case, upon receiving encrypted data, the receiving section continuously buffers or holds the received data until the decrypting section is allowed to change the decryption key, and is not able to smoothly perform the processing on the data. For example, even when the next IP packet arrives, if the decryption processing using the previous decryption key has not been completed and the receiving buffer is full, re-transmission is enabled due to the packet receiving error.

SUMMARY OF THE INVENTION

It is therefore desirable to provide an information processing apparatus and method, and a computer program therefor in which content encrypted for copyright protection or other purposes can appropriately be decrypted.

It is also desirable to provide an information processing apparatus and method, and a computer program therefor in which content encrypted and transmitted over an IP network can appropriately be decrypted.

It is further desirable to provide an information processing apparatus and method, and a computer program therefor in which encrypted data input as a long byte stream such as a TCP stream with dynamically changing decryption keys can appropriately be decrypted.

It is further desirable to provide an information processing apparatus and method, and a computer program therefor in which a byte stream encrypted with dynamically changing decryption keys can appropriately be decrypted without interrupting processing at a key change point where the key being used is changed.

According to a first embodiment of the present invention, there is provided an information processing apparatus for processing encrypted data input as a byte stream with dynamically changing decryption keys. The information processing apparatus includes the following elements. An encrypted data receiving section receives encrypted data input as a byte stream, identifies a range of data that is decrypted using an identical key as a unit of decryption, extracts information necessary for decryption from the byte stream, and outputs encrypted data sets in which the extracted information is added to segments of the encrypted data. An encrypted data decrypting section sequentially decrypts the encrypted data by queuing the encrypted data sets while distributing the encrypted data sets over a memory to generate plaintext data. A plaintext processing section processes the generated plaintext data.

An embodiment of the present invention relates to an information processing apparatus that receives encrypted data as a byte stream over a network, such as TCP/IP, or from a file system and that decrypts the encrypted data, more specifically, an information processing apparatus that decrypts encrypted data input as a long byte stream such as a TCP stream.

Even in encrypted communication, if the same cryptographic key is continuously used, the risk of breaking the key in the middle of the communication increases. Therefore, a byte stream is encrypted with dynamically changing decryption keys, and is transmitted. This type of system may include content transmission based on the HTTP protocol between a DTCP_Source device and a DTCP_Sink device.

However, in a case where such an encrypted byte stream is received and decrypted for processing, the processing may be interrupted at a key change point where the decryption key is changed. This is because a decrypting module for decrypting the encrypted data is not allowed to change the key until encrypted data in a range of data that is decrypted using the same key, i.e., a unit of decryption, has been decrypted, thus preventing the encrypted data in the unit of decryption by which decryption is performed using the new key from being input.

An information processing apparatus according to an embodiment of the present invention includes a receiving section receiving encrypted data, a decrypting section decrypting the encrypted data, and a processing section performing playback or other data processing on the decrypted data.

Upon receiving encrypted data input as a byte stream, the receiving section identifies a range of the data that is decrypted using the same key as a unit of decryption, extracts information necessary for decryption from the byte stream, and forwards encrypted data sets in which the extracted information is added to segments of the encrypted data to the decrypting section.

Upon receiving the encrypted data sets, the decrypting section queues the received data sets while distributing the data over a memory, and sequentially decrypts the data to generate plaintext data. The generated plaintext data is forwarded to the processing section downstream from the decrypting section.

In the information processing apparatus according to the embodiment of the present invention, the receiving section and the decrypting section can individually operate. Thus, even if a parameter necessary for decryption, such as a nonce, is dynamically changed in the middle of the byte stream, the operations of the receiving section and the decrypting section are not interfered with, and processing is not interrupted at the point where the decryption key is changed.

The encrypted data receiving section may generate the encrypted data sets by the length of the encrypted data that can be read, and may segment the encrypted data sets at a key change point. Further, the encrypted data receiving section may include information, such as the length of the original data, information indicating at which position of the encrypted data stream the segment of the encrypted data is located, and the length of the unit of decryption to which the encrypted data belongs, in each of the encrypted data sets.

Since the decryption-key-related information is included in each of the encrypted data sets, the receiving section and the decrypting section can independently operate. If the key is changed, the decrypting section is sufficient to modify the key according to the information, and it is not necessary for the receiving section to stop the input and output operation of a queue.

Further, the decrypting section may store data in a queue as much as possible, and may sequentially process the encrypted data sets received in the queue. Since the encrypted data sets are stored in a queue, the decrypting section has no buffer area and does not need to copy the segments of the encrypted data.

Accordingly, in the information processing apparatus according to the embodiment of the present invention, the receiving section and the decrypting section have less correlation, and the respective modules can independently operate. This also means simplification of the implementations of the respective function modules.

According to a second embodiment of the present invention, there is provided a computer-readable computer program for executing on a computer system a process for processing encrypted data input as a byte stream with dynamically changing decryption keys. The computer program causes the computer system to execute the steps of receiving encrypted data input as a byte stream, identifying a range of data that is decrypted using an identical key as a unit of decryption, extracting information necessary for decryption from the byte stream, and outputting encrypted data sets in which the extracted information is added to segments of the encrypted data; sequentially decrypting the encrypted data by queuing the encrypted data sets while distributing the encrypted data sets to generate plaintext data; and processing the generated plaintext data.

The computer program according to the second embodiment of the present invention is a computer program written in a computer-readable format so that predetermined processing can be executed on a computer system. In other words, the computer program according to the second embodiment of the present invention is installed in the computer system, thereby exerting a cooperative effect on the computer system and achieving similar advantages as those of the information processing apparatus according to the first embodiment of the present invention.

According to an embodiment of the present invention, therefore, a superior information processing apparatus and method, and computer program therefor in which encrypted data input as a long byte stream, such as a TCP stream, with dynamically changing decryption keys can appropriately be decrypted.

Further, according to an embodiment of the present invention, a superior information processing apparatus and method, and computer program therefor in which a byte stream encrypted with dynamically changing decryption keys can appropriately be decrypted without interrupting processing at a key change point where the key being used is changed.

According to the information processing apparatus of the embodiment of the present invention, a communication apparatus that receives an encrypted byte stream can smoothly perform processing up to the processing for decrypting the received data. The receiving section and the decrypting section do not depend on each other and can independently operate. The respective function modules can therefore be simplified. Further, the decrypting section does not have a buffer area for storing encrypted data that has not been decrypted, and does not need copying for transfer of the encrypted data. The performance of the decryption processing for encrypted streams can therefore be improved.

Other objects, features, and advantages of the present invention will become apparent from the following embodiments of the present invention and more detailed description with reference to the accompanying drawings.

DESCRIPTION OF THE PREFERRED EMBODIMENTS

An embodiment of the present invention will be described in detail with reference to the drawings.

An embodiment of the present invention relates to an information communication system for receiving encrypted data as a byte stream over a network, such as TCP/IP, or from a file system and decrypting the received data, more specifically, an information communication system for performing encrypted communication for a long byte stream, such as a TCP stream, with decryption keys changed in the middle of the communication. A specific example of the system includes content transmission based on the HTTP protocol between a DTCP_Source device and a DTCP_Sink device.

System Configuration

Figure 1:
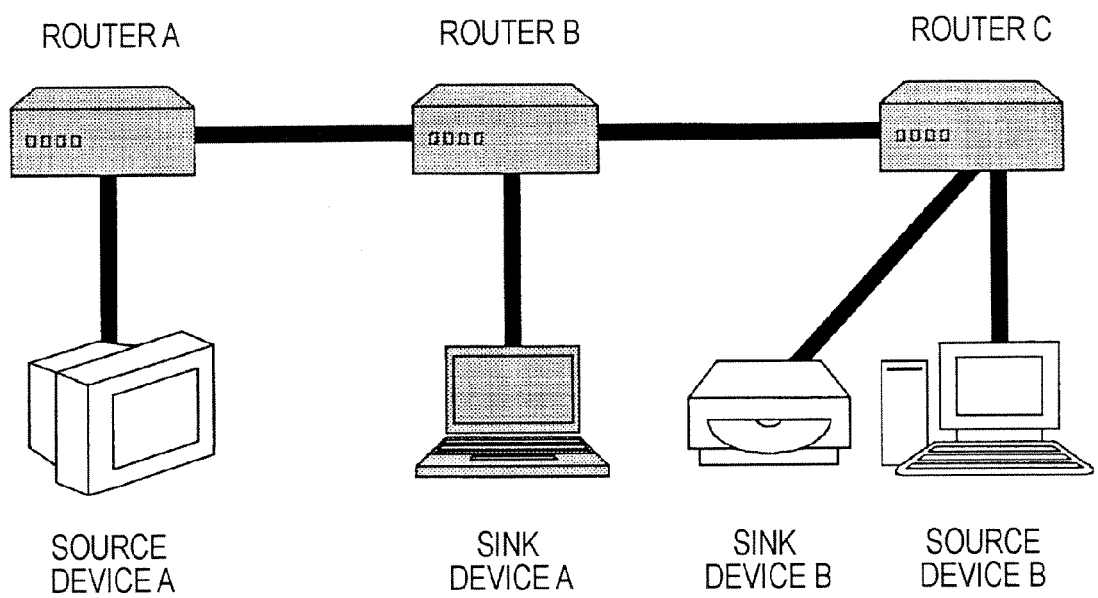
FIG. 1 is a schematic diagram showing an example structure of an information communication system according to an embodiment of the present invention.

FIG. 1 schematically illustrates an example structure of an information communication system according to an embodiment of the present invention.

In the illustrated example, entities of source devices A and B, sink devices A and B, and routers A to C constitute a DTCP-IP AKE system.

The source device A, which is a DTCP-IP-compliant authentication server, and the sink device A, which is a DTCP-IP-compliant authentication client, are connected over a network via the routers A and B.

The source device B, which is a DTCP-IP-compliant authentication server, and the sink device B, which is a DTCP-IP-compliant authentication client, are further connected over an IP network via the routers A, B, and C.

Figure 2:
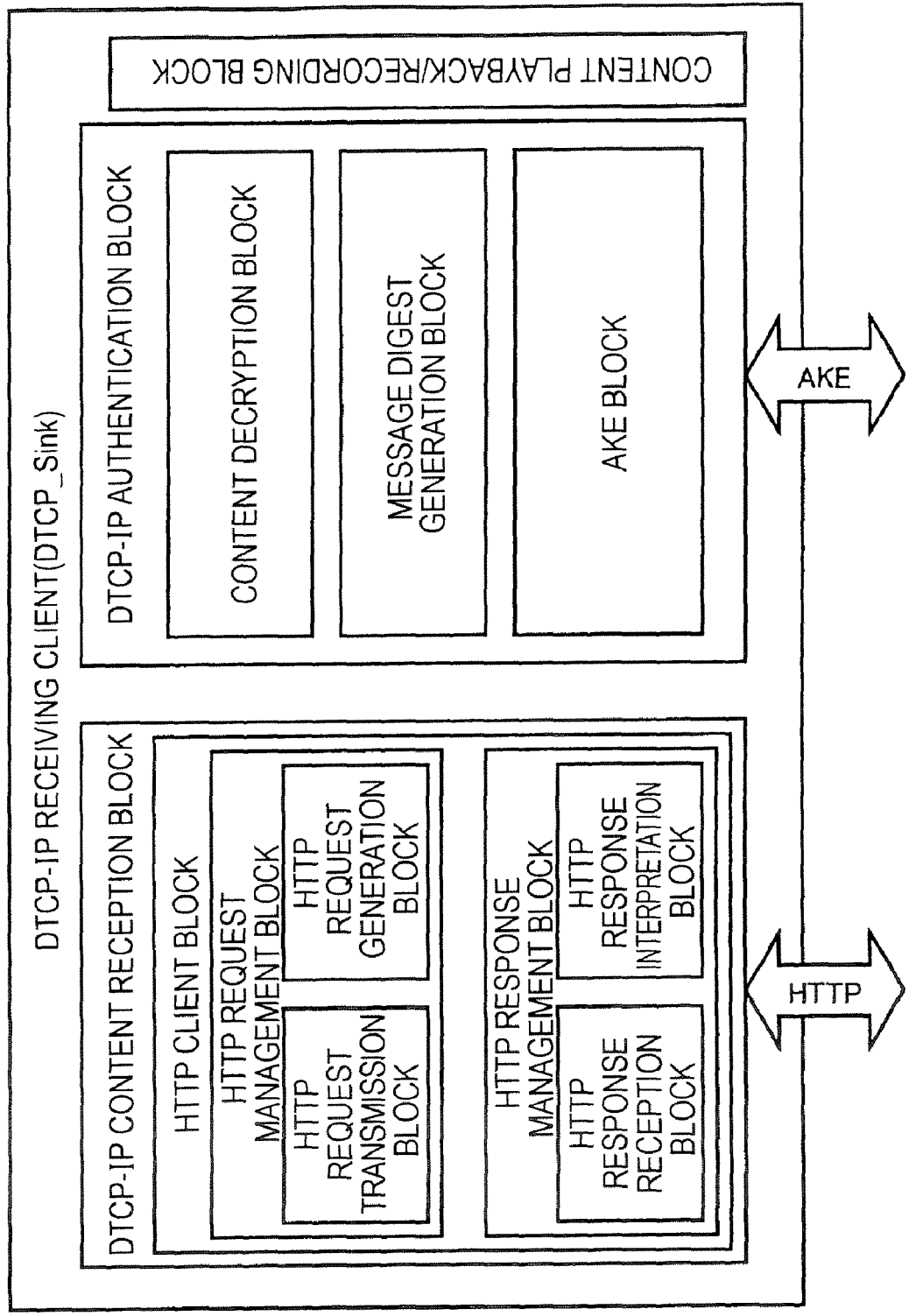
FIG. 2 is a schematic diagram showing a functional structure of an information communication apparatus operating as a client (that is, a sink device) in the information communication system shown in FIG. 1.
Figure 3:
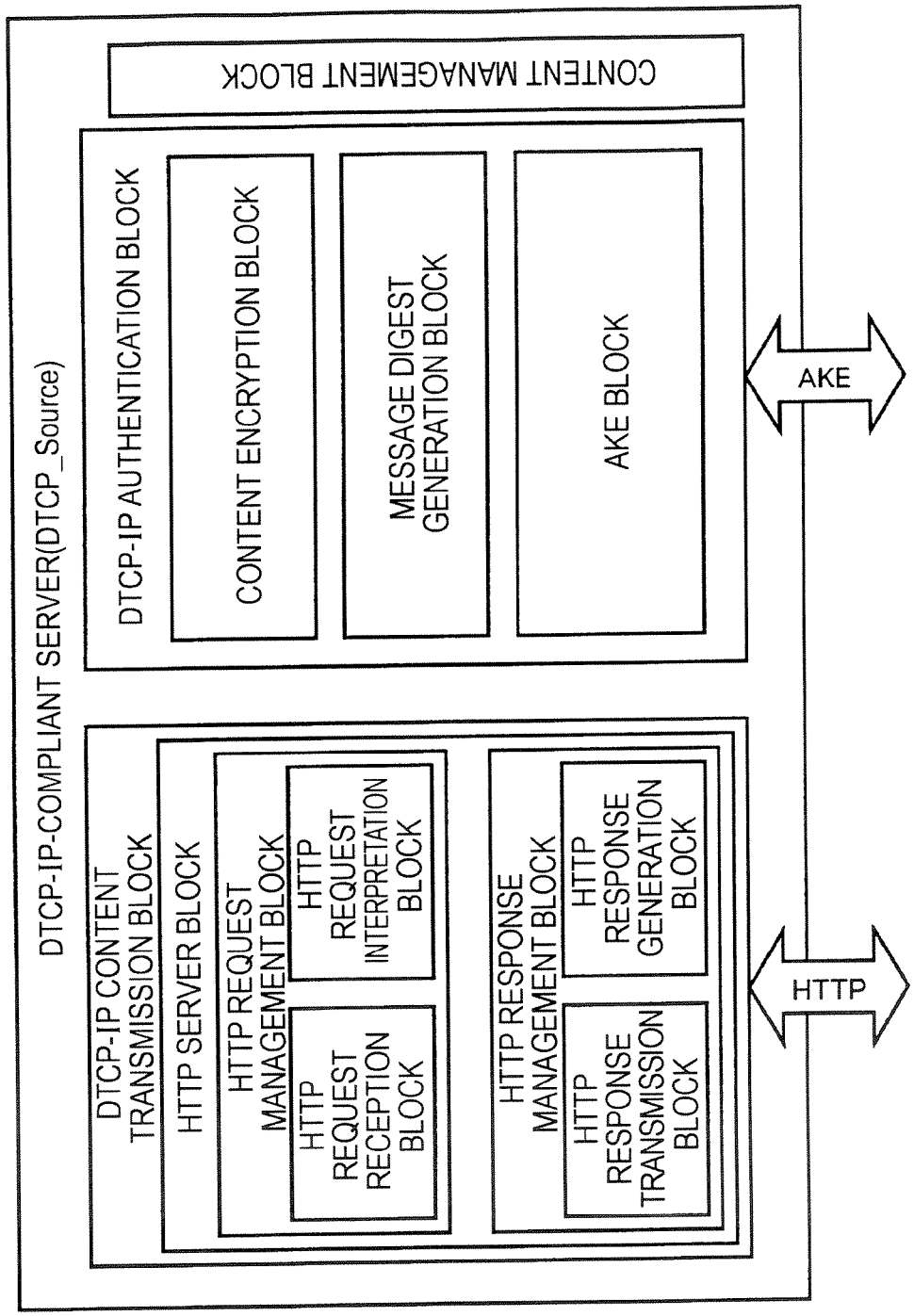
FIG. 3 is a schematic diagram showing a functional structure of an information communication apparatus operating as a server (that is, a source device) in the information communication system shown in FIG. 1.

FIGS. 2 and 3 schematically illustrate functional structures of information communication apparatuses operating as a client (i.e., a sink device) and a server (i.e., a source device) in the information communication system shown in FIG. 1, respectively. The sink device and the source device can establish a connection over a TCP/IP network (not shown), such as the Internet, and can perform an authentication procedure and a content transmission procedure by using the connection.

The sink device shown in FIG. 2 complies with the DTCP-IP standard, and operates as a DTCP_Sink device. The illustrated client device is provided with functional blocks including a DTCP-IP authentication block, a DTCP-IP content reception block, and a content playback/recording block.

The DTCP-IP authentication block includes an AKE block, a message digest generation block, and a content decryption block.

The AKE block is a block for implementing an AKE mechanism in DTCP-IP (at the DTCP_Sink side). The AKE block also has a function for forwarding a parameter requested by the message digest generation block, discussed below.

The message digest generation block is a block for generating a message digest in the parameter according to a designated algorithm. A predetermined algorithm may be designated as the algorithm by which the message digest is generated. The predetermined algorithm may be an algorithm associated with a one-way hash function, such as MD5 or SHA-1 (SHA-1 is an improved variant of MD4, like MD5; however, SHA-1 generates a hash value of 160 bits and has higher strength than the MD series).

The message digest generation block is located close to the AKE block so as to generate a message digest in the parameter held by the AKE block, which should not be released outside the DTCP-IP authentication block. The message digest generation block can submit a request to the AKE block to obtain the parameter, and can produce a message digest in the obtained parameter or a parameter given from the outside.

The content decryption block is a block for decrypting the encrypted content data received from the server by determining a decryption key for the content using a key exchanged by means of AKE. The decrypted content is forwarded to the content playback/recording block.

The content playback/recording block plays back the forwarded content in a playback mode, or stores the content in a recording mode.

The DTCP-IP content reception block is a processing module that executes a content transmission procedure after carrying out AKE. In the illustrated example, the DTCP-IP content reception block includes an HTTP client block, and serves as an HTTP client to submit a request for content to an HTTP server and to receive the content from the HTTP server in response to the request.

The HTTP client block is divided into an HTTP request management block and an HTTP response management block. The HTTP request management block is further divided into an HTTP request transmission block and an HTTP request generation block.

The HTTP request generation block generates a content transmission request (HTTP request) to be transmitted. The generated HTTP request is transmitted to the server by the HTTP request transmission block.

The HTTP response management block is divided into an HTTP response reception block and an HTTP response interpretation block. An HTTP response and encrypted content returned from the server are received by the HTTP response reception block. The received HTTP response is checked by the HTTP response interpretation block. If the check is good, the received encrypted content is forwarded to the content decryption block in the DTCP-IP authentication block. If the check is bad, processing for providing an error response is performed.

The DTCP-IP authentication block and the DTCP-IP content reception block establish separate TCP/IP connections with the server device, and individually perform an authentication procedure and a content transmission procedure.

The source device shown in FIG. 3 complies with the DTCP-IP standard, and operates as a DTCP_Source device. The server device is provided with functional blocks including a DTCP-IP authentication block, a DTCP-IP content transmission block, and a content management block.

The DTCP-IP authentication block includes an AKE block, a message digest generation block, and a content encryption block.

The AKE block is a block for implementing an AKE mechanism in DTCP-IP (at the DTCP_Source side). The AKE block also has a function for forwarding a parameter requested by the message digest generation block, discussed below. The AKE block holds a corresponding number of pieces of information on authenticated DTCP_Sink devices to the number of authenticated devices, and uses the information to determine whether or not a requesting client is an authenticated client when content is requested.

The message digest generation block is a block for generating a message digest in the parameter according to a designated algorithm. The algorithm by which the message digest is generated may be a predetermined algorithm, e.g., an algorithm associated with a one-way hash function, such as MD5 or SHA-1 (the same as above applies).

The message digest generation block is located close to the AKE block so as to generate a message digest in the parameter held by the AKE block, which should not be released to outside the DTCP-IP authentication block. The message digest generation block can submit a request to the AKE block to obtain the parameter, and can produce a message digest in the obtained parameter or a parameter given from the outside.

The content encryption block is a block for encrypting content data retrieved from the content management block using a content key generated from a key exchanged by means of AKE in response to a request from the DTCP-IP content transmission block. The encrypted content is forwarded to the DTCP-IP content transmission block to transmit the content to the client.

The content management block is a block that manages content to be protected by using the DTCP-IP mechanism. In response to retrieval by the content encryption block, the content management block forwards the data of the content.

The DTCP-IP content transmission block includes an HTTP server block, and serves as an HTTP server to receive a request from the client and to execute processing according to the request.

The HTTP server block is divided into an HTTP request management block and an HTTP response management block. The HTTP request management block is further divided into an HTTP request reception block and an HTTP request interpretation block.

The HTTP request reception block receives an HTTP request from the client. The received HTTP request is forwarded to the HTTP request interpretation block to check the request. If the check by the HTTP request interpretation block is good, the DTCP-IP authentication block is notified of the information of the HTTP request.

The HTTP response management block is divided into an HTTP response generation block and an HTTP response transmission block.

The HTTP response generation block produces an HTTP response for returning the encrypted content when the check by the HTTP request interpretation block is good. If the check by the HTTP request interpretation block is bad, the HTTP response generation block produces an HTTP response for returning an error.

The HTTP response transmission block transmits the produced HTTP response to the requesting client. If the check by the HTTP request interpretation block is good, the HTTP response transmission block also transmits the HTTP response header followed by the content encrypted by the content encryption block in the DTCP-IP authentication block.

The DTCP-IP authentication block and the DTCP-IP content transmission block establish separate TCP/IP connections with a sink device, and individually perform an authentication procedure and a content transmission procedure.

The message digest generation blocks in the DTCP-IP authentication blocks provided for the DTCP-Sink device and the DTCP-Source device are not the function modules specified by DTCP-IP itself, and do not directly relate to the essence of the present invention. For example, Japanese Patent Application No. 2004-113459, assigned to the present assignee, discloses a message digest generation block.

HTTP-Based Content Transmission

Figure 4:
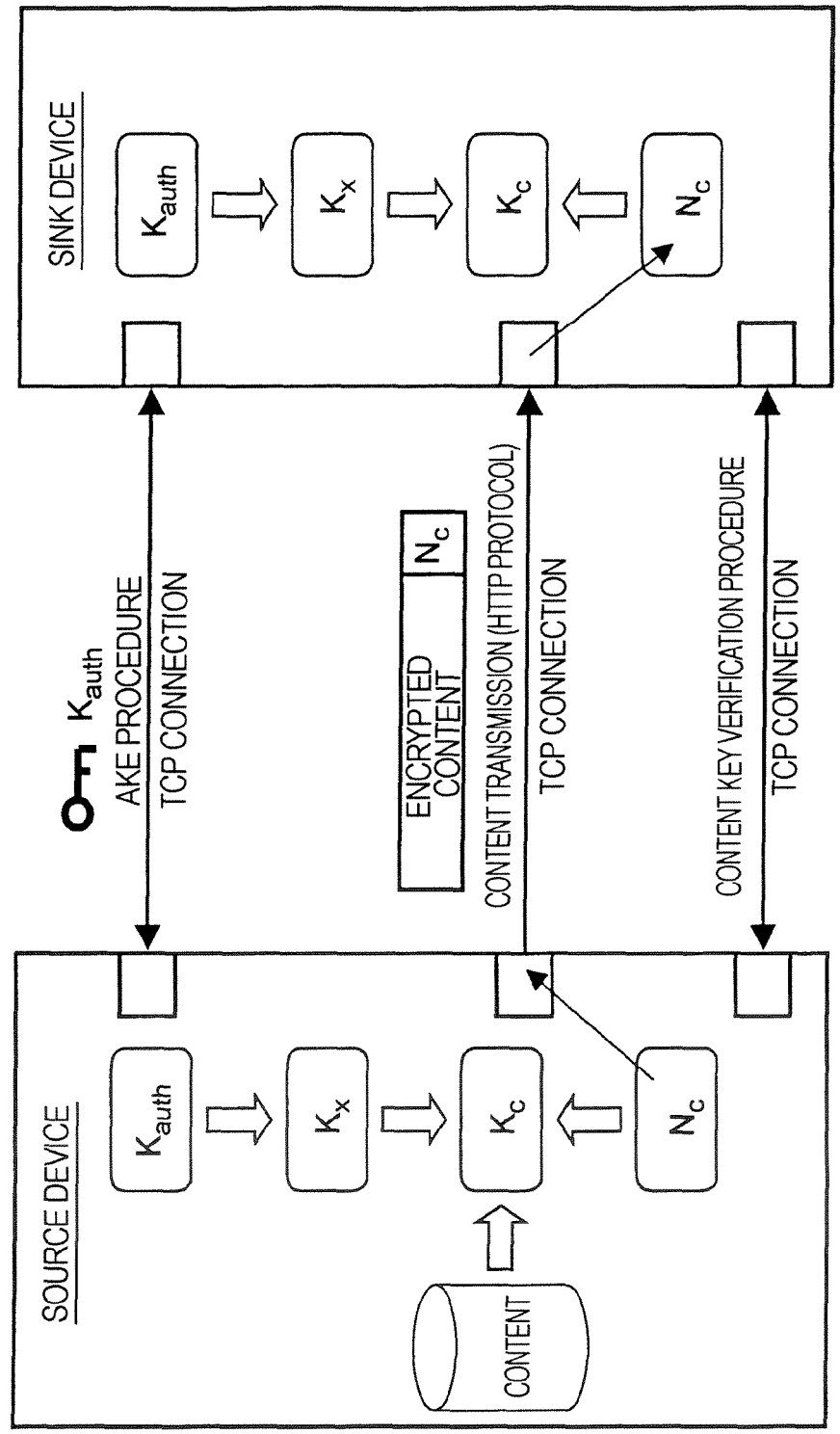
FIG. 4 is diagram showing a mechanism for performing an AKE procedure and content transmission using the HTTP protocol between a DTCP_Source device and a DTCP_Sink device.

FIG. 4 illustrates a mechanism for performing an AKE procedure between a DTCP_Source device and a DTCP_Sink device and performing content transmission using the HTTP protocol. A TCP connection for the AKE procedure, and a TCP connection for a content request using HTTP and verification of a content key are separately established between the DTCP_Source device and the DTCP_Sink device (that is, each of the DTCP_Source device and the DTCP_Sink device has individual sockets for the AKE procedure, content transmission, and verification of the content key (a socket is a set of an IP address and a port number)).

First, a TCP connection for the AKE procedure is established, and an authentication key $K_{auth}$ is shared between the DTCP_Source device and the DTCP_Sink device if the AKE procedure succeeds. When the AKE procedure ends, the TCP connection is disconnected. Then, the DTCP_Source device and the DTCP_Sink device individually perform similar internal processing to generate a seed key $K_x$, which is the seed of a content key, from the authentication key $K_{auth}$.

Then, a TCP connection for content transmission using the HTTP protocol is established in response to a content request from the DTCP-Sink device.

The DTCP_Source device generates a nonce $N_c$ using random numbers, and generates the content key $K_c$ based on the seed key $K_x$ and the nonce $N_c$. Then, the DTCP_Source device encrypts the content requested by the DTCP_Sink device using the content key $K_c$, and sends a TCP stream carrying the encrypted content and the nonce $N_c$ to the DTCP_Sink device. Under the IP protocol, the TCP stream is divided by a predetermined packet size as a unit into packets to produce IP packets by adding headers to the packets, and the IP packets are delivered to a specified IP address.

Upon receiving the IP packets from the DTCP_Source device, the DTCP_Sink device reassembles the received IP packets into the TCP stream. The nonce $N_c$ extracted from the stream and a key $K_x$ determined from the authentication key $K_{auth}$ are used to determine the content key $K_c$. The content key $K_c$ is used to decrypt the received encrypted content.

When the content transmission using the HTTP protocol is finished, the used TCP connection is appropriately disconnected.

If the same cryptographic key is continuously used across an entire long TCP stream, the risk of breaking the key increases. In DTCP-IP, therefore, it is specified that a source device should update the nonce $N_c$, or the content key $K_c$, every 128 MB of content. In a byte stream, the range of data that is encrypted using the content key $K_c$ generated from the same nonce $N_c$ is used as a unit of decryption by which decryption is performed using the same key.

In reception and decryption processing for an encrypted stream with dynamically changing decryption keys, the processing may be interrupted at the key change point where the used key is changed. In this embodiment, in the DTCP-Sink device, upon receiving encrypted data input as a byte stream, a receiving section identifies a range of the data that is decrypted using the same key as a unit of decryption, extracts information necessary for decryption, such as a nonce, from the byte stream, and forwards encrypted data sets in which the extracted information is added to segments of the encrypted data to a decrypting section downstream from the receiving section. Since the receiving section and the decrypting section can independently operate, the operations of the receiving section and the decrypting section are not interfered with even if a parameter necessary for decryption, such as a nonce, is dynamically changed in the middle of the byte stream, whereby processing is not interrupted at the point where the decryption key is changed. The details are discussed below.

Since the decryption key is dynamically changed in the middle of the byte stream, a TCP connection for verification of the content key is further established, and the DTCP_Sink device performs a content key verification procedure with the DTCP_Source device. The DTCP_Sink device establishes the TCP connection whenever the verification of the content key is needed. When the DTCP_Sink device finishes playback or other plaintext processing for the decrypted content, the key verification is no longer necessary, and the TCP connection is disconnected. The procedure itself does not directly relate to the essence of the present invention, and no further description of the verification procedure is provided herein.

Reception and Decryption Processing for Encrypted Content

As discussed above, DTCP-IP can provide a secure content transmission protocol even over an IP network, which enables the content to be protected against eavesdropping or tampering in the middle of the transmission line by performing authentication between DTCP-compliant devices to share a key between the DTCP-authenticated devices and encrypting and decrypting transmission content. Further, if the same cryptographic key is continuously used across an entire long TCP stream, the risk of breaking the key increases. In DTCP-IP, therefore, it is specified that the nonce $N_c$, or the content key $K_c$, should be updated every 128 MB of content.

When an encrypted byte stream with decryption key dynamically changed in the middle is received and decrypted for processing, the processing may be interrupted at a key change point where the decryption keys are changed. This is because the decrypting module is not allowed to change the key until encrypted data in a range of data that is decrypted using the same key, i.e., a unit of decryption, has been decrypted, thus preventing the encrypted data in the unit of decryption by which decryption is performed using the changed key from being input.

In the DTCP_Sink device according to this embodiment, on the other hand, upon receiving encrypted data input as a byte stream, a receiving section identifies a range of the data that is decrypted using the same key as a unit of decryption, extracts information necessary decryption, such as a nonce, from the byte stream, and forwards encrypted data sets in which the extracted information is added to segments of the encrypted data to a decrypting section downstream from the receiving section. Since the receiving section and the decrypting section can independently operate, even if a parameter necessary for decryption, such as a nonce, is dynamically changed in the middle of the byte stream, the operations of the receiving section and the decrypting section are not interfered with, and processing is not interrupted at the point where the decryption key is changed.

The details of the reception and decryption processing for an encrypted byte stream by the DTCP_Sink device will be described hereinbelow.

Figure 5:
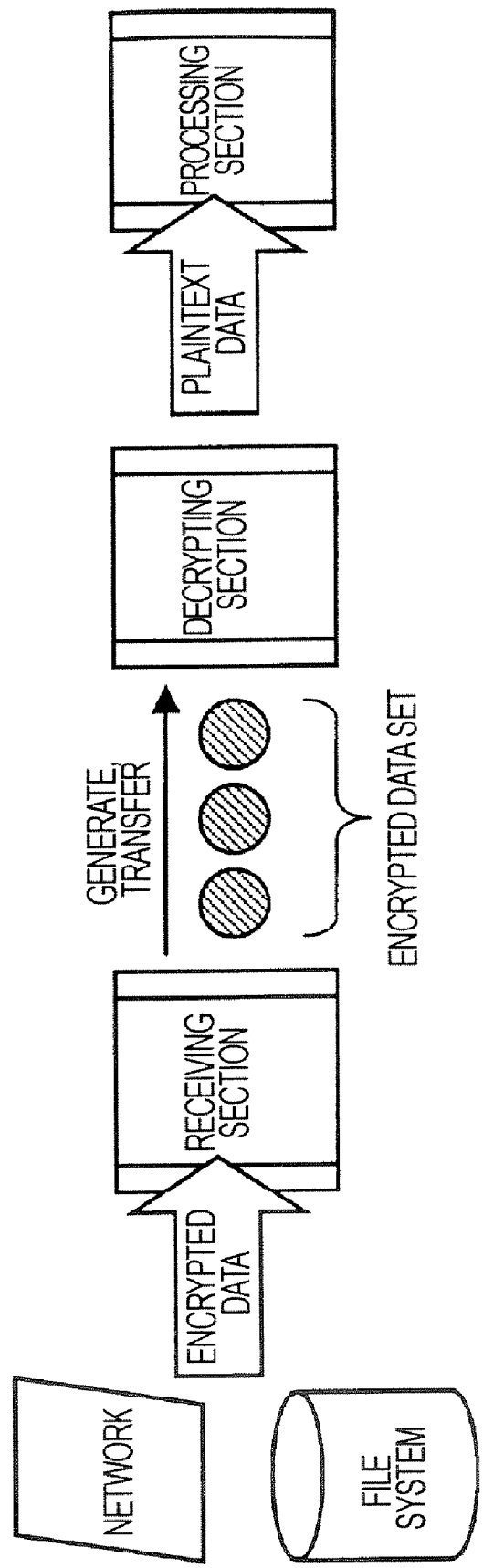
FIG. 5 is a schematic diagram showing a functional structure of the DTCP_Sink device for receiving and decrypting an encrypted byte stream.

FIG. 5 schematically illustrates a functional structure of the DTCP_Sink device for performing reception and decryption processing for an encrypted byte stream. As illustrated in FIG. 5, the DTCP_Sink device includes function modules including a receiving section that receives encrypted data, a decrypting section that decrypts the encrypted data, and a processing section that performs playback or other data processing on the decrypted data.

The receiving section corresponds to the HTTP response management block in the DTCP-IP content reception block, and the decrypting section corresponds to the content decryption block in the DTCP-IP authentication block (see FIG. 2). The processing section corresponds to a content playback application for playing back and outputting the decrypted plaintext content, such as video or audio content.

Upon receiving encrypted data in the form of a byte stream over a network or from a file system, first, the receiving section reads decryption information necessary for decryption, such as the nonce $N_c$ or a decryption key, from the read encrypted data. Then, the receiving section identifies a unit of decryption in the encrypted stream by which decryption is performed using the same key, divides the unit of decryption into segments having an appropriate size, adds the decryption information to each of the segments to generate an encrypted data set, and transfers the generated data sets to the decrypting section.

Figure 6:
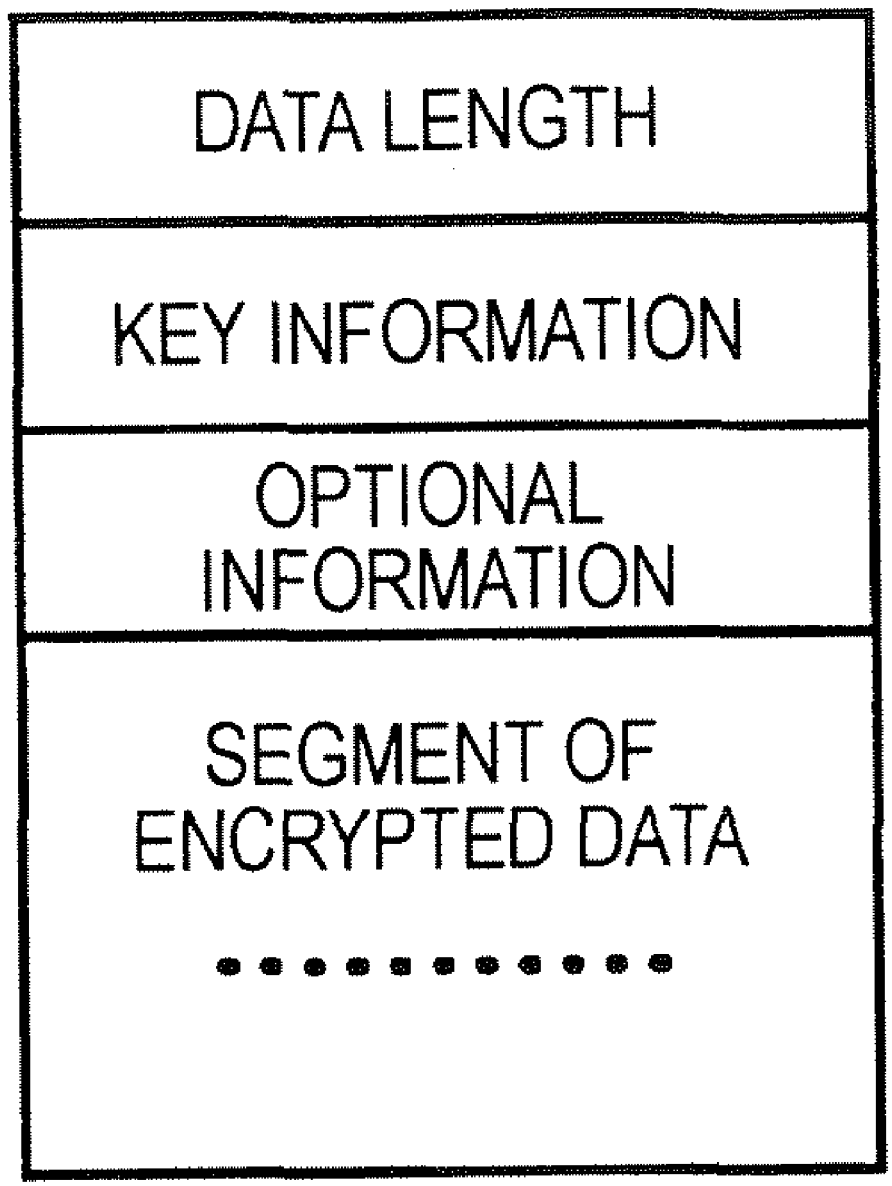
FIG. 6 is a diagram showing an example data structure of an encrypted data set.

FIG. 6 illustrates an example data structure of an encrypted data set. In the illustrated example, the encrypted data set is composed of objects representing the length of the segment of the encrypted data included in this data set, decryption-key-related information, such as the nonce $N_c$, optional data necessary for decrypting the encrypted data set, and the segment of the encrypted data.

It takes some time to receive encrypted data of the whole unit of decryption, or the length of data in one unit of decryption may be sufficiently large as the size of data per transfer to the decrypting section. Thus, the receiving section appropriately divides the encrypted data of the unit of decryption into segments to generate encrypted data sets. The length of each of the segments of the encrypted data may be, for example, a length of the encrypted data that can be read one time from the network or a length of the encrypted data that is read by a single operation from a file system. However, this length is not necessarily a fixed length because the length is specified in every encrypted data set. The receiving section can therefore generate an encrypted data set each time a length of the encrypted data is read, instead of generating encrypted data sets after reading the entirety of the encrypted data. It is to be noted that the encrypted data sets should be segmented at a key change point.

The key-related information added to the encrypted data sets may be the key itself, or a copy mode associated with the key. In the DTCP-IP-based content transmission procedure shown in FIG. 4, the nonce $N_c$ carried on the encrypted stream by the DTCP_Source device is the key-related information.

The optional data contains information indicating at which position of the encrypted data stream the segment of the encrypted data included in the encrypted data set is located (that is, the relative position in the byte stream), and information about the length of the unit of decryption to which the encrypted data belongs.

The contents of the information to be written as the optional data depend on the decryption method or the like. For example, encrypted data to be handled under DTCP-IP1 is composed of one or more protected content packets (PCPs). One PCP designates information for decrypting the data included in the PCP, and the information contains the length of the original data before it is encrypted.

In DTCP-IP, a so-called 128-bit Advanced Encryption Standard (AES) algorithm is used to encrypt the original data. The original data is input to this algorithm, thereby obtaining encrypted data of the same size. Since the unit of input is fixed to 128 bits, if the data size at a key change point or the end of the original data is smaller than 128 bits, data filled with zeros up to 128 bits is input (if the data size is greater than 128 bits, iterations of encryption of 128 bits are performed). For decryption using this algorithm, the encrypted data of a length of multiples of 128 bits is input to obtain the original data of the same size. If the original data larger than the size designated in the PCP is obtained, data of up to this size is handled as effective data (likewise, iterations of decryption in units of 128 bits are performed).

In this embodiment, key information (=E-EMI) is read from a PCP handled under DTCP-IP, and a group of encrypted data sets is generated each time encrypted data included in the PCP is read from a network or a file system, and is transferred to the decrypting section.

Figure 7:
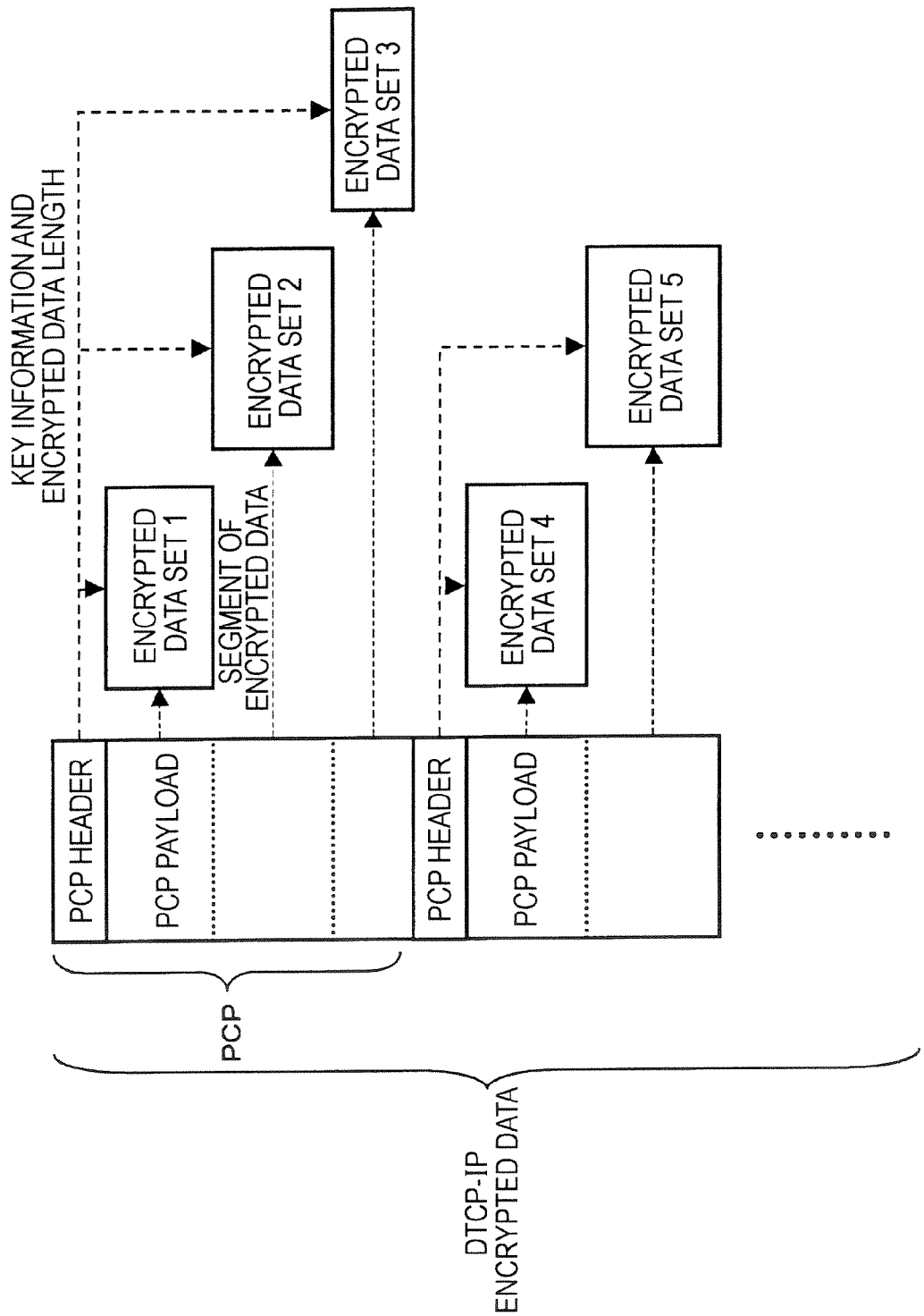
FIG. 7 is a diagram showing that an encrypted data set is created from DTCP-IP encrypted data.

FIG. 7 illustrates that the receiving section generates encrypted data sets from DTCP-IP encrypted data. The encrypted data handled under DTCP-IP1 is composed of one or more PCPs, and one PCP is used as the unit of decryption by which decryption can be performed using the same decryption key. The receiving section adds the key information written in the header of the PCP to a segment of the encrypted data having a length each time the length of the encrypted data is read to sequentially generate encrypted data sets 1, 2, . . . .

Since the effective range of the decrypted data is to be identified at the key change point or at the end of the encrypted data, information, such as information indicating which portion of the encrypted data stream the segment of the encrypted data is located at and the length of the original data, is also contained in the encrypted data set. In this manner, the optional data designates parameters that depend on the decryption protocol or the like.

A data area for storing the segments of the encrypted data included in the encrypted data stream is needed to generate encrypted data sets. In an operating system having a virtual memory, it is easy to dynamically ensure the area to configure encrypted data sets. In resource-limited hardware, a similar mechanism can be implemented by using techniques, such as re-using the area.

Upon receiving the group of encrypted data sets transferred from the receiving section, the decrypting section stores the group of encrypted data sets in a queue.

Figure 11:
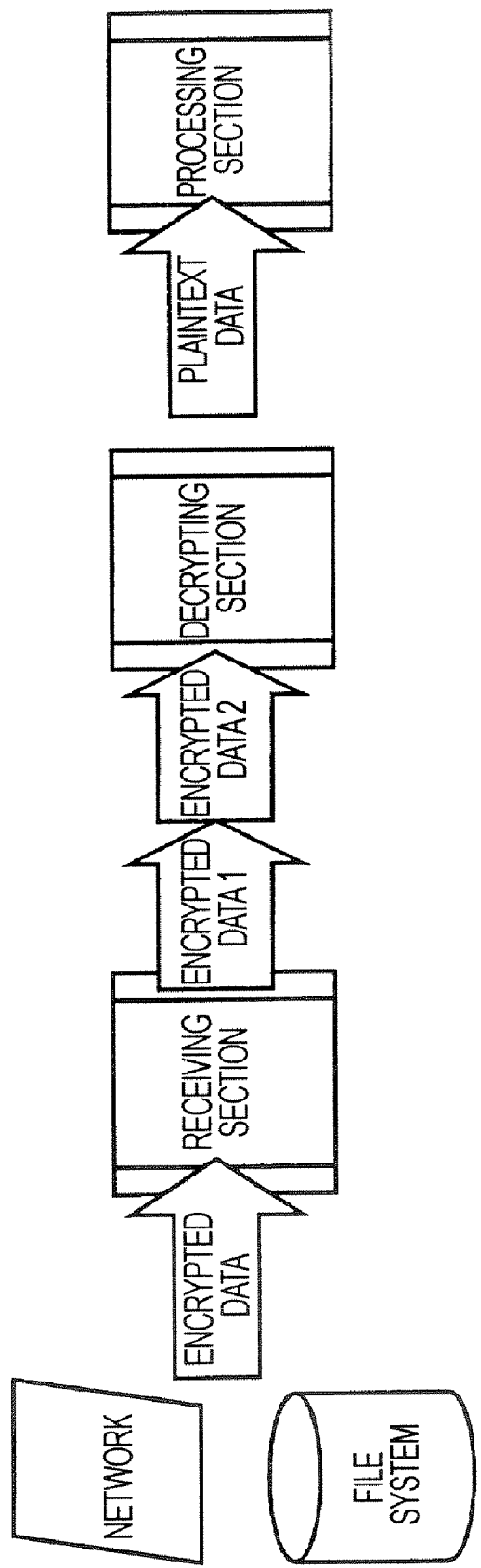
FIG. 11 is a schematic diagram showing a functional structure of a communication apparatus of the related art that receives a byte stream transmitted with decryption keys changed in the middle of the transmission.

In encrypted data decryption processing of the related art, received encrypted data is copied into consecutive memory areas, and the decrypting section sequentially reads and decrypts the encrypted data from the memory (see FIG. 11). In this case, if a decryption key for encrypted data input as a byte stream is dynamically changed, after confirming that the encrypted data to be processed using the same key, that is, the encrypted data of the unit of decryption, has been completely decrypted, the decryption key for the next unit of decryption is set in the decrypting section, and, then, the encrypted data to be decrypted using the new key is input. In such a method, however, the receiving section controls the transfer of the encrypted data according to the state of the decrypting section, which thus causes a problem in that the delivery of the data may be interrupted before and after a timing at which the decryption key is changed.

In this embodiment, the receiving section can transfer encrypted data sets as much as possible irrespective of the progress of decryption by the decrypting section. The decrypting section stores the data in a queue as much as possible, and sequentially processes the encrypted data sets in the queue. Since the decryption-key-related information is included in the encrypted data sets, if the key is changed, the decrypting section is sufficient to modify the key according to the decryption-key-related information, and it is not necessary for the receiving section to stop the input and output operation of the queue. Further, since the decrypting section stores the encrypted data sets in a queue, the decrypting section has no buffer area and does not need to copy the segments of the encrypted data. The decrypting section transfers the decrypted plaintext data to the processing section.

The processing section performs processing specified by the user on the plaintext data. For example, the processing section inputs the decrypted movie or audio data to a decoder to play back the data, or stores any format of data in a file system.

In the information processing apparatus according to this embodiment, therefore, the receiving section and the decrypting section have less correlation, and the respective modules can independently operate. This also means simplification of the implementations of the respective function modules.

The overview of the process for receiving and decrypting an encrypted byte stream performed by the DTCP-Sink device according to this embodiment has been illustrated with reference to FIG. 5. That is, the receiving section reads data from the received byte stream to generate encrypted data sets, and transfers the generated data sets to the decrypting section. The decrypting section decrypts the segments of the encrypted data using specified key information if the encrypted data sets are queued, and transfers the decrypted data to the processing section. The processing section performs processing specified by the user on the plaintext data.

Figure 8:
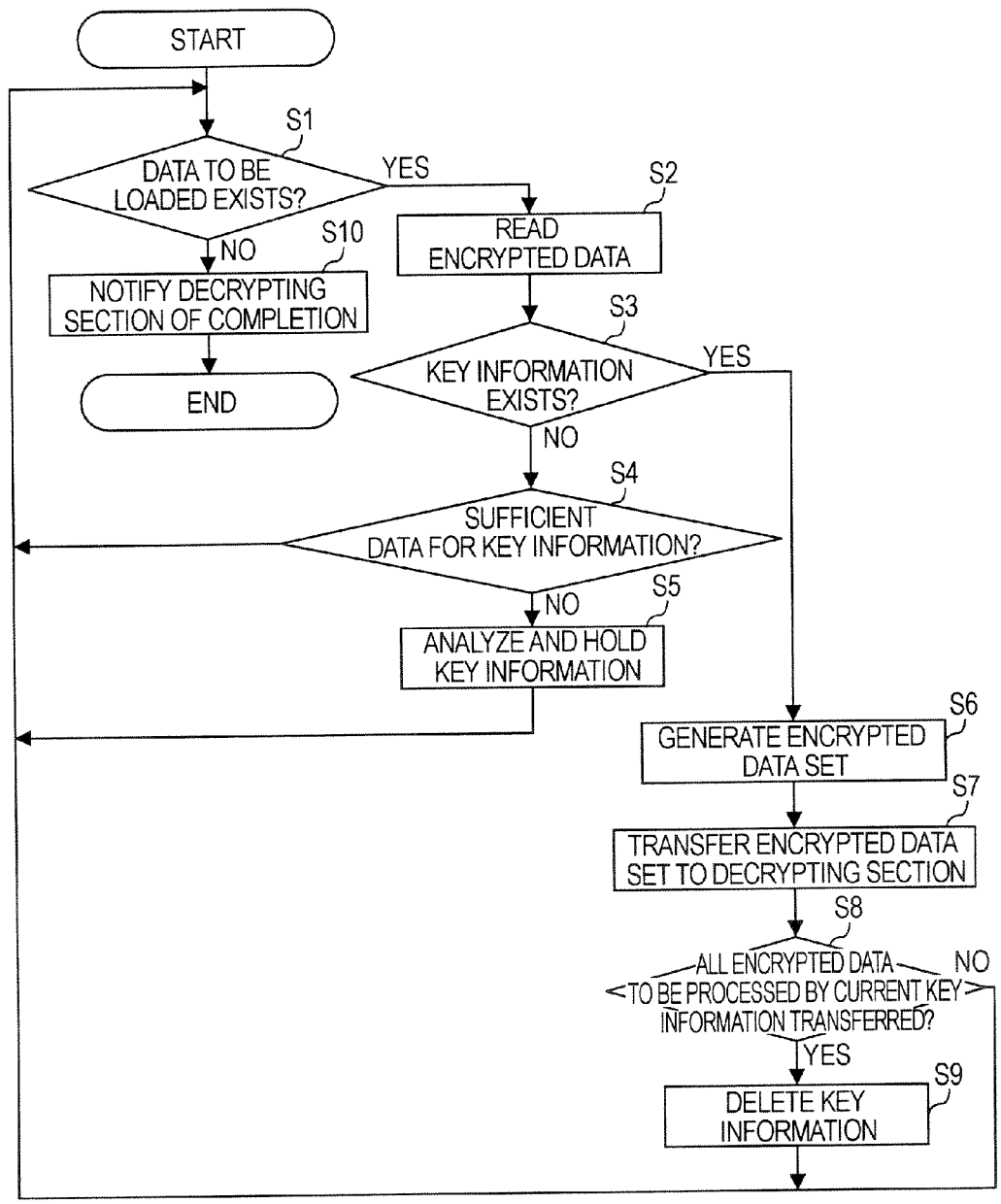
FIG. 8 is a flowchart showing a processing procedure performed by the receiving section.

FIG. 8 is a flowchart showing a processing procedure performed by the receiving section.

First, it is determined whether or not encrypted data can be read from a designated input device, such as a network or file system (step S1). If there is readable encrypted data, the process proceeds to step S2. If there is no readable encrypted data, the process proceeds to step S10, and the processing routine ends. Even though there is no readable data (the process ends), if an unprocessed portion remains in the encrypted data read in the previous iteration and the key information is stored, the process proceeds to step S2.

In step S2, encrypted data is read from the input device, and is stored by the receiving section. The size of the data to be read is arbitrary, and all of the encrypted data is not necessarily read. If data read in the previous iteration remains, the newly read data is connected after the previously read data.

It is determined whether or not the receiving section has stored therein the key information for the currently processed unit of decryption (step S3). If the receiving section has the key information stored therein, the process proceeds to step S6. If the key information has not been obtained, the process proceeds to step S4 to analyze the key information. The process also proceeds to step S4 when the key information has been asynchronously changed or when the current key information is to be deleted and new key information is to be analyzed depending on the contents of the read encrypted data.

In step S4, it is determined whether or not a sufficient amount of encrypted data for obtaining the key information has been read. If the sufficient amount of data has not been read, the process returns to step S1.

If the data is sufficient for obtaining the key information, then, in step S5, the key information is analyzed from the read encrypted data, and the result is stored. Then, the data used for analysis of the key information is deleted from the receiving section. Then, the process returns to step S1.

In step S6, the key information, the necessary optional information, and a segment of the read encrypted data are used to generate an encrypted data set. The segment of the encrypted data included in the encrypted data set can be copied to and stored in a newly created area. In order to prevent an increase in the load caused by copying, a new area may be created each time encrypted data is read in step S1, and the encrypted data may directly be loaded into the area to include the data in the encrypted data set.

Then, the generated encrypted data set is transferred to the decrypting section (step S7). After transferring the encrypted data set, the segment of the transferred encrypted data is deleted from the read encrypted data (or is assigned a mark indicating that the data has been transferred).

If the effective encrypted data length is specified in the current key information and all of the encrypted data of the specified length has been transferred to the decrypting section (that is, all of the encrypted data of the unit of decryption has been transferred) (step S8), the process proceeds to step S9; otherwise, the process returns to step S1. In step S9, the stored key information is deleted. Then, the process returns to step S1. In step S10, the receiving section notifies the decrypting section of completion, and, then, the processing routine ends.

Figure 9:
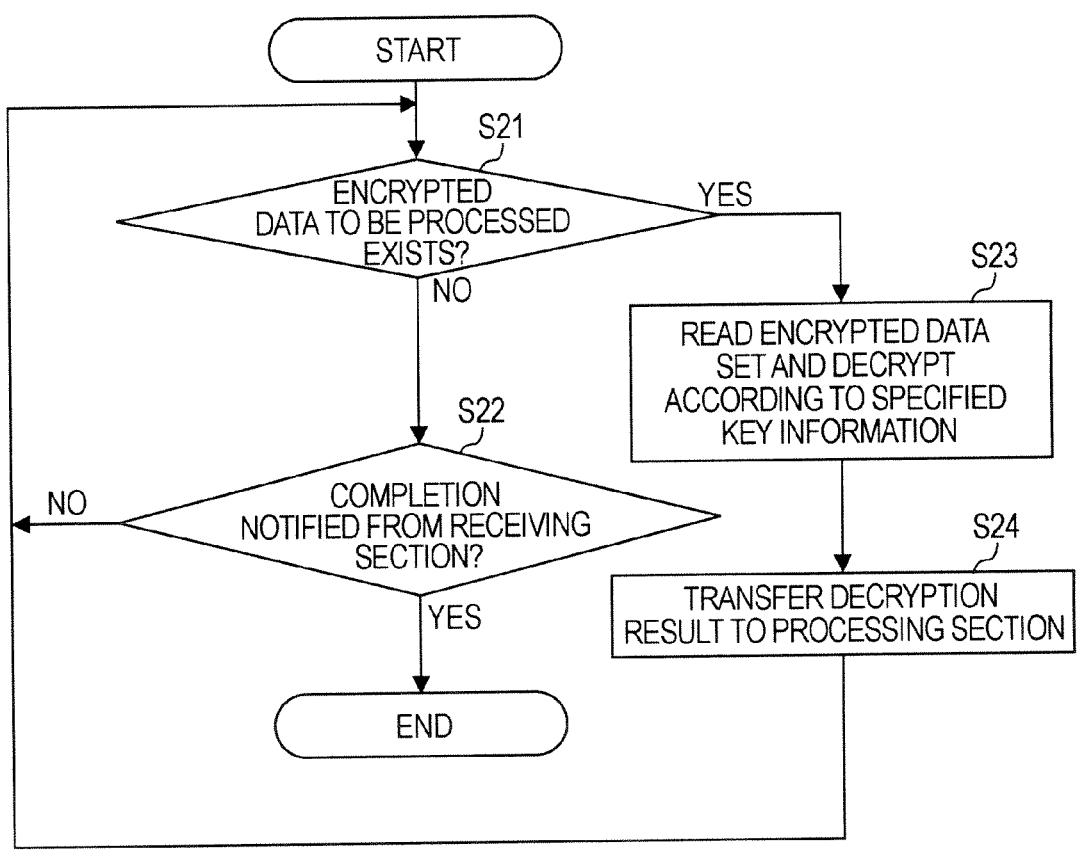
FIG. 9 is a flowchart showing a processing procedure performed by the decrypting section.
Figure 10:
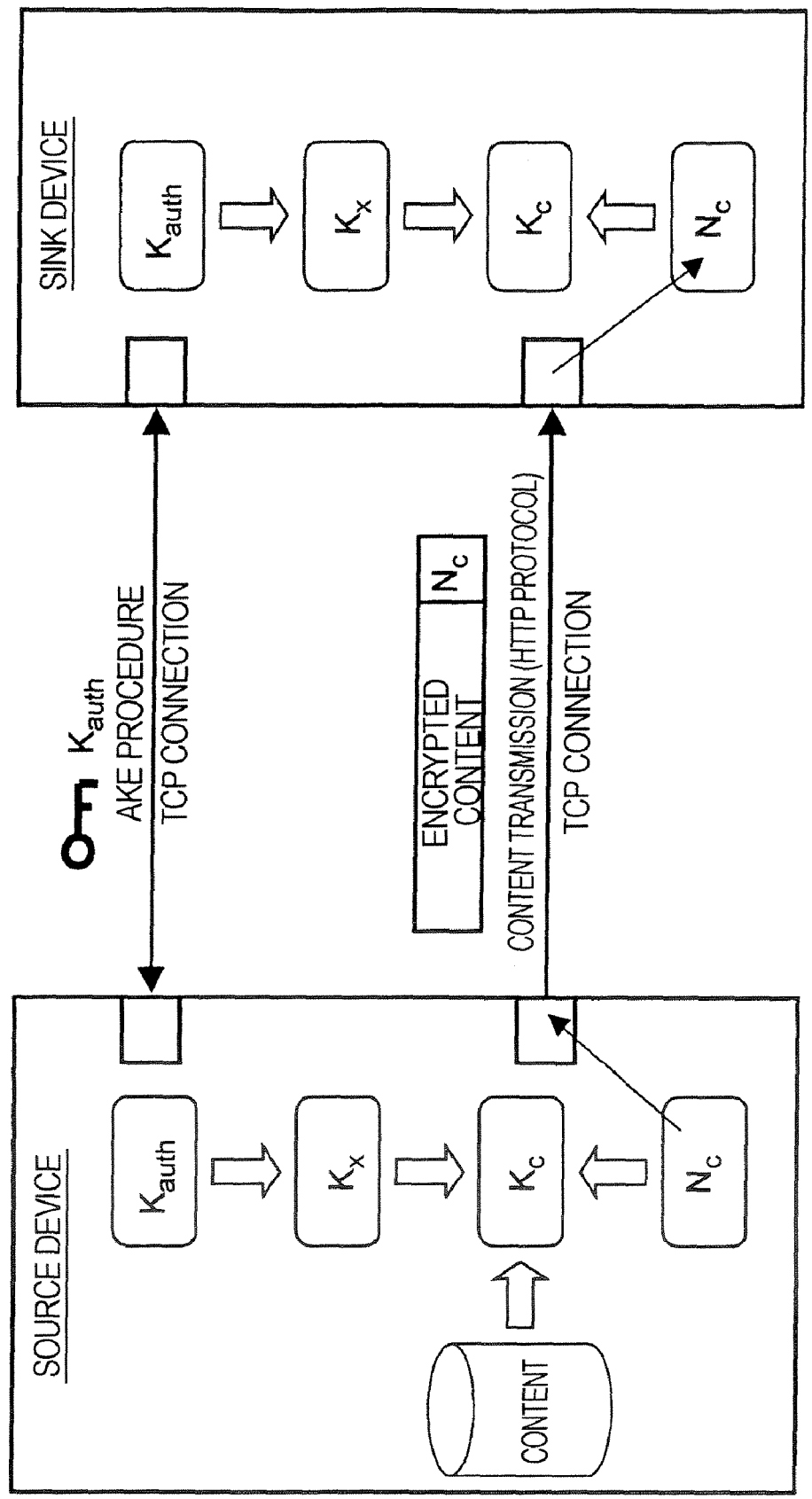
FIG. 10 is a diagram showing a mechanism for performing an AKE procedure and content transmission using the HTTP protocol between a DTCP_Source device and a DTCP_Sink device.

FIG. 9 is a flowchart showing a processing procedure performed by the decrypting section.

First, it is determined whether or not one or more encrypted data sets have been transferred to the decrypting section from the receiving section and stored in a queue of the decrypting section (step S21). If an encrypted data set has been stored, the process proceeds to step S23. If no encrypted data set has been transferred, the process proceeds to step S22.

In step S22, it is determined whether or not a completion notification has been issued by the receiving section. If the notification has not been issued, the process returns to step S21. If the completion notification has been issued by the receiving section, the decrypting section enters the completion state, and the processing routine ends.

In step S23, an encrypted data set is read from the queue, and is decrypted using the key information or optional information designated therein. After performing the decryption, the process proceeds to step S24.

In step S24, the decryption result is transferred to the processing section, and the process returns to step S21 to process the next encrypted data set.

The present invention has been described in detail in the context of a specific embodiment. However, it is to be understood that modifications or alternatives to the embodiment could be made by those skilled in the art without departing from the scope of the present invention.

While content transmission using the HTTP protocol between a DTCP_Source device and a DTCP_Sink device has been described in the context of an exemplary embodiment of the present invention, the present invention is not limited thereto. Various other types of information communication systems that perform encrypted communication with decryption keys changed in the middle of a long byte stream may also constitute embodiments of the present invention.

In summary, the present invention has been disclosed by way of exemplary embodiments, and the contents disclosed herein should not be restrictively construed. The scope of the present invention should be determined in consideration of the appended claims.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for processing encrypted data input as a byte stream with dynamically changing decryption keys, the information processing apparatus comprising:

a processor including an encrypted data receiving section configured to receive the encrypted data input as the byte stream, identify a range of the encrypted data that is encrypted using an identical key as a unit of decryption, extract information necessary for decryption from the byte stream, the information necessary for decryption including a decryption key or decryption key- related information for calculating the decryption key, generate encrypted data sets based on the extracted information necessary for decryption, segments of the encrypted data input as the byte stream, and one or more decryption key change points, and output the encrypted data sets in which the extracted information necessary for decryption is added to the segments of the encrypted data input as the byte stream;

an encrypted data decrypting section configured to sequentially decrypt the encrypted data sets, based on the extracted information necessary for encryption included in the encrypted data sets, to generate plaintext data; and a plaintext processing section configured to process the generated plaintext data.

2. The information processing apparatus according to claim 1, wherein the encrypted data receiving section is configured to generate the encrypted data sets based on a length of the encrypted data input as the byte stream that can be read at one time, or by a single operation, and to segment the encrypted data sets at a decryption key change point.

3. The information processing apparatus according to claim 1, wherein the encrypted data receiving section includes in each of the encrypted data sets the length of the data before the data is encrypted, information indicating at which position of the encrypted data stream the segment of the encrypted data input as the byte stream is located, and the length of the unit of decryption to which the encrypted data input as the byte stream belongs.

4. The information processing apparatus according to claim 1, wherein the encrypted data receiving section is configured to transfer the encrypted data sets irrespective of the progress of decryption performed by the encrypted data decrypting section.

5. An information processing method of an information processing apparatus for processing encrypted data input as a byte stream with dynamically changing decryption keys, the information processing method comprising:

receiving, by the information processing apparatus, the encrypted data input as the byte stream;

identifying, by the information processing apparatus, a range of the encrypted data that is encrypted using an identical key as a unit of decryption;

extracting, by the processor of the information processing apparatus, information necessary for decryption from the byte stream, the information necessary for decryption including a decryption key or decryption key-related information for calculating the decryption key;

generating, by the information processing apparatus, encrypted data sets based on the extracted information necessary for decryption, segments of the encrypted data input as the byte stream, and one or more decryption key change points;

outputting, by the information processing apparatus, the encrypted data sets in which the extracted information necessary for decryption is added to the segments of the encrypted data input as the byte stream;

sequentially decrypting, by the information processing apparatus, the encrypted data sets, based on the extracted information necessary for encryption included in the encrypted data sets, to generate plaintext data; and processing the generated plaintext data.

6. The information processing method according to claim 5, wherein in the outputting step, the encrypted data sets are transferred irrespective of the progress of decryption performed in the decrypting step.

7. A non-transitory computer-readable storage medium having embedded therein instructions, which when executed on a computer system, cause the computer system to perform a process of an information processing apparatus for processing encrypted data input as a byte stream with dynamically changing decryption keys, the method comprising:

receiving, by the information processing apparatus, the encrypted data input as the byte stream;

identifying, by the information processing apparatus, a range of the encrypted data that is encrypted using an identical key as a unit of decryption;

extracting, by the information processing apparatus, information necessary for decryption from the byte stream, the information necessary for decryption including a decryption key or decryption key-related information for calculating the decryption key;

generating, by the information processing apparatus, encrypted data sets based on the extracted information necessary for decryption, segments of the encrypted data input as the byte stream, and one or more decryption key change points;

outputting, by the information processing apparatus, the encrypted data sets in which the extracted information necessary for decryption is added to the segments of the encrypted data input as the byte stream;

sequentially, by the information processing apparatus, decrypting the encrypted data sets, based on the extracted information necessary for encryption included in the encrypted data sets, to generate plaintext data; and processing the generated plaintext data.

8. The information processing apparatus according to claim 1, wherein the encrypted data decrypting section is configured to calculate, based on the decryption key-related information included in the encrypted data sets, the dynamically changing decryption keys to decrypt the encrypted data input as the byte stream.

9. The non-transitory computer-readable storage medium according to claim 7, wherein in the generating step, the length of the data before the data is encrypted, information indicating at which position of the encrypted data stream the segment of the encrypted data is located, and the length of the unit of decryption to which the encrypted data input as the byte stream belongs are included in each of the encrypted data sets.

10. The information processing method according to claim 5, wherein in the generating step, the length of the data before the data is encrypted, information indicating at which position of the encrypted data stream the segment of the encrypted data is located, and the length of the unit of decryption to which the encrypted data input as the byte stream belongs are included in each of the encrypted data sets.

11. The information processing method according to claim 5, wherein in the decrypting step, the dynamically changing decryption keys to decrypt the encrypted data input as the byte stream is calculated based on the decryption key-related information included in the encrypted data sets.

12. The non-transitory computer-readable storage medium according to claim 7, wherein in the outputting step, the encrypted data sets are transferred irrespective of the progress of decryption performed in the decrypting step.

13. The non-transitory computer-readable storage medium according to claim 7, wherein in the decrypting step, the dynamically changing decryption keys to decrypt the encrypted data input as the byte stream is calculated based on the decryption key-related information included in the encrypted data sets.

14. The information processing apparatus according to claim 1, wherein the encrypted data receiving section is configured to receive the encrypted data input as the byte stream over a network.

15. The information processing method according to claim 5, further comprising:
   receiving, by the processor of the information processing apparatus, the encrypted data input as the byte stream over a network.

16. The information processing method according to claim 5, wherein in the generating step, the encrypted data sets are generated based on a length of the encrypted data input as the byte stream that can be read at one time, or by a single operation, and the encrypted data sets are segmented at a decryption key change point.

17. The non-transitory computer-readable storage medium according to claim 7, wherein in the generating step, the encrypted data sets are generated based on a length of the encrypted data input as the byte stream that can be read at one time, or by a single operation, and the encrypted data sets are segmented at a decryption key change point.

18. The non-transitory computer-readable storage medium according to claim 7, further comprising:
   receiving the encrypted data input as the byte stream over a network.

* * * * *